United States Patent
Ow et al.

(10) Patent No.: US 9,363,563 B2
(45) Date of Patent: *Jun. 7, 2016

(54) SECURED MEDIA DISTRIBUTION SYSTEM AND METHOD

(71) Applicants: Duvon Corporation, Las Vegas, NV (US); Benedict Ow, Las Vegas, NV (US)

(72) Inventors: Benedict Ow, Las Vegas, NV (US); Andrew Platter, Las Vegas, NV (US); Dmitry Kogosov, Las Vegas, NV (US); Richard Stiles, Las Vegas, NV (US)

(73) Assignee: Duvon Corporation, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,860

(22) Filed: Apr. 22, 2015

(65) Prior Publication Data

US 2015/0229994 A1 Aug. 13, 2015

Related U.S. Application Data

(63) Continuation of application No. 13/865,908, filed on Apr. 18, 2013, now Pat. No. 9,027,050.

(60) Provisional application No. 61/749,305, filed on Jan. 5, 2013.

(51) Int. Cl.
*H04N 7/167* (2011.01)
*H04N 21/4627* (2011.01)
*H04N 21/40* (2011.01)
*H04N 21/254* (2011.01)
*H04N 21/433* (2011.01)
*H04N 21/436* (2011.01)

(52) U.S. Cl.
CPC ....... *H04N 21/4627* (2013.01); *H04N 21/2541* (2013.01); *H04N 21/40* (2013.01); *H04N 21/4334* (2013.01); *H04N 21/43615* (2013.01)

(58) Field of Classification Search
CPC ..................................................... H04N 21/40
USPC .......................................................... 725/31
See application file for complete search history.

(56) References Cited

U.S. PATENT DOCUMENTS

| | | | | |
|---|---|---|---|---|
| 7,739,715 B2* | 6/2010 | He | ..................... | H04L 29/06027 725/102 |
| 2002/0162109 A1* | 10/2002 | Shteyn | ............... | H04N 7/17336 725/87 |
| 2005/0210502 A1* | 9/2005 | Flickinger | .............. | G06Q 30/02 725/34 |
| 2008/0109335 A1* | 5/2008 | Keohane | .............. | G06Q 10/107 705/35 |
| 2009/0217332 A1* | 8/2009 | Hindle | ................... | H04N 5/782 725/109 |

* cited by examiner

*Primary Examiner* — Olugbenga Idowu
(74) *Attorney, Agent, or Firm* — Lightbulb IP, LLC

(57) ABSTRACT

A media distribution system provides controlled distribution of media owned by various parties hosted on a local media access device. The media access device may store temporary media, such as rented or leased media, on a separate provider controlled storage partition. This gives the media provider control over rented or leased media even though it is locally hosted. The media access device can download media from providers at various predefined times so as to limit its use of bandwidth.

17 Claims, 4 Drawing Sheets

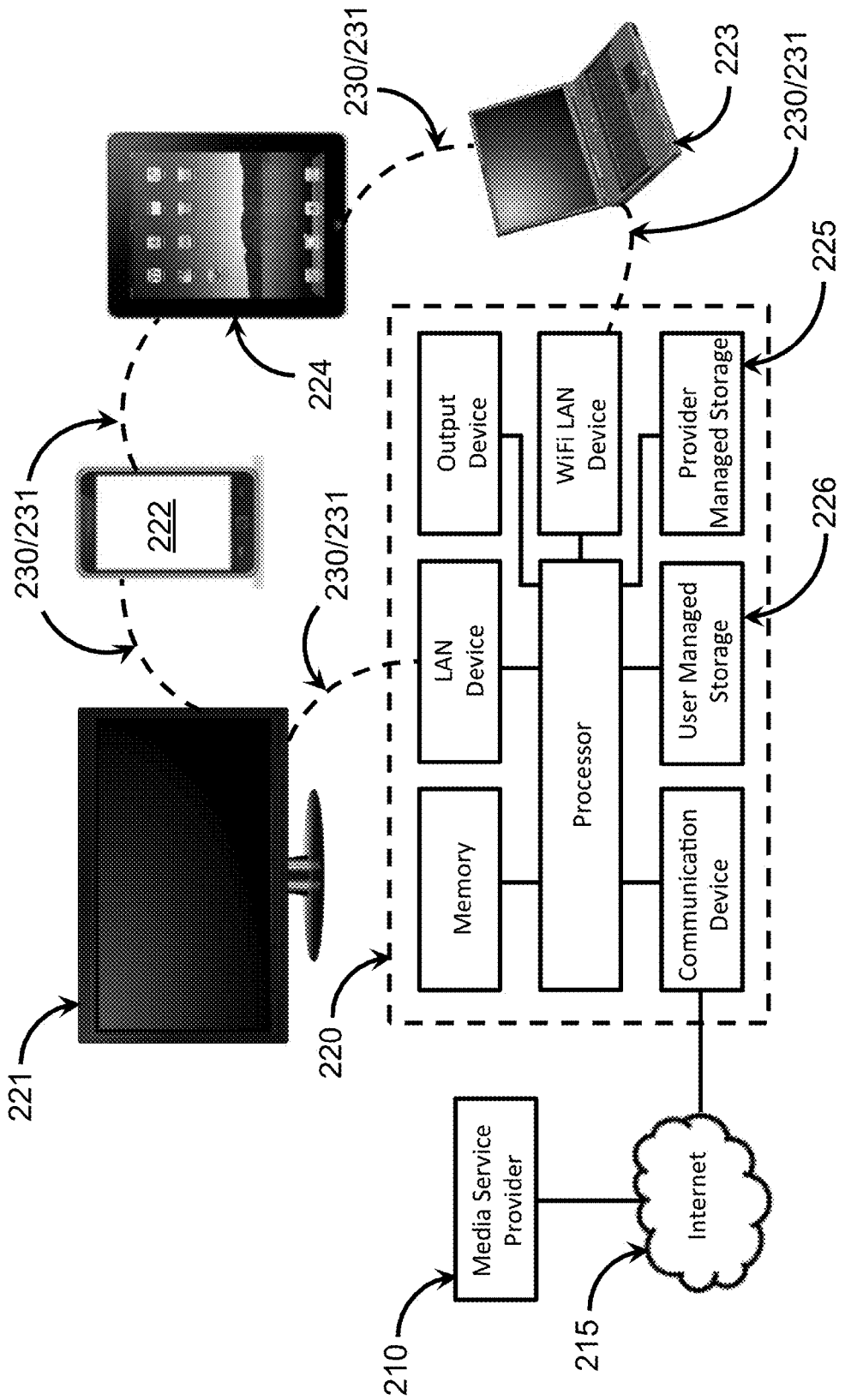

SECURED MEDIA DISTRIBUTION SYSTEM AND METHOD

CROSS-REFERENCE TO RELATED APPLICATIONS

This application is a continuation of U.S. patent application Ser. No. 13/865,908, filed Apr. 18, 2013, which claims the benefit of U.S. Provisional Patent Application No. 61/749,305, filed Jan. 5, 2013.

BACKGROUND OF THE INVENTION

1. Field of the Invention

The invention relates to distribution and storage of digital media, and in particular to a secured media distribution system and method therefor.

2. Related Art

The devices, features, and functions described herein are intended to address the movie and media delivery marketplace. There are currently a number of movie and media delivery systems available that provide users the capability to stream movies online to their TVs, PCs, and portable smart devices.

From the discussion that follows, it will become apparent that the present invention addresses the deficiencies associated with the prior art while providing numerous additional advantages and benefits not contemplated or possible with prior art constructions.

SUMMARY OF THE INVENTION

A media distribution system comprising a media access device is disclosed herein. The media distribution system herein provides an alternative to traditional media delivery methodologies while enhancing access and use controls for media providers and users.

Various systems and methods for media distribution are disclosed herein. For example, in one embodiment a media access device is disclosed, with such media access device comprising one or more storage devices having at least one provider managed partition and at least one user managed partition, one or more communication devices that receive media, and one or more processors that determine if the media is provider media or if the media is user media based on ownership of the media. The media is stored in the provider managed partition if the media is determined to be provider media, and the media is stored in the user managed partition if the media is determined to be user media.

The processors may move the provider media from the provider managed partition to the user managed partition when ownership of the provider media changes. Alternatively or in addition, the processors may move the provider media from the provider managed partition to the user managed partition when a user purchases the provider media. One or more output terminals that output the user media or the provider media for presentation to a user may be included in the media access device.

The communication devices may receive one or more instructions from a media provider defining use and access restrictions for the provider media. A media provider may control addition and removal of the provider media via the communication devices. A user may control addition and removal of user media in the user managed partition.

In another exemplary embodiment, a non-transitory storage medium is disclosed. In this embodiment, the non-transitory storage medium stores instructions that, when executed, cause one or more processors to receive media via one or more communication devices, determine if the media is provider media or if the media is user media based on ownership of the media, store the media in a provider managed partition of one or more storage devices if the media is determined to be provider media, and store the media in a user managed partition of the storage devices if the media is determined to be user media. The provider media or the user media is transmitted via one or more output terminals for presentation to a user.

The instructions may also cause the processors to move the provider media from the provider managed partition to the user managed partition when ownership of the provider media changes. In addition or alternatively, the instructions may cause the processors to move the provider media from the provider managed partition to the user managed partition when a user purchases the provider media.

The instructions may cause the processors to add or remove the provider media based on instructions received from a media provider. Also, the instructions may cause the processors to add or remove the user media based on instructions received from a user. In addition, the instructions may cause the processors to change access and use restrictions for the provider media based on instructions received from a media provider. It is noted that the provider media or the user media may be transmitted via the output terminals is selected by a user.

In another exemplary embodiment, a media access device implemented method for providing media is disclosed, with such method comprising, receiving media via one or more communication devices of the media access device, determining if the media is provider media or user media based on ownership of the media, and storing provider media in a provider media partition and storing user media in a user media partition based on the determination. The provider media partition and the user media partition are partitions of one or more storage devices of the media access device. The provider media or the user media is presented to a user via one or more output terminals of the media access device.

The provider media may be moved to the user media partition when ownership of the provider media changes. In addition or alternatively, the provider media may be moved to the user media partition when the provider media is purchased by a user. It is noted that the provider media may be added or removed based on one or more instructions from a media provider. Similarly, the user media may be added or removed based on one or more instructions from a user. Access to the provider media may be provided based on use and access restrictions defined by a media provider.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2B is a block diagram illustrating an exemplary media distribution system and components thereof in an exemplary environment of use.

DETAILED DESCRIPTION OF THE INVENTION

Figure 1:
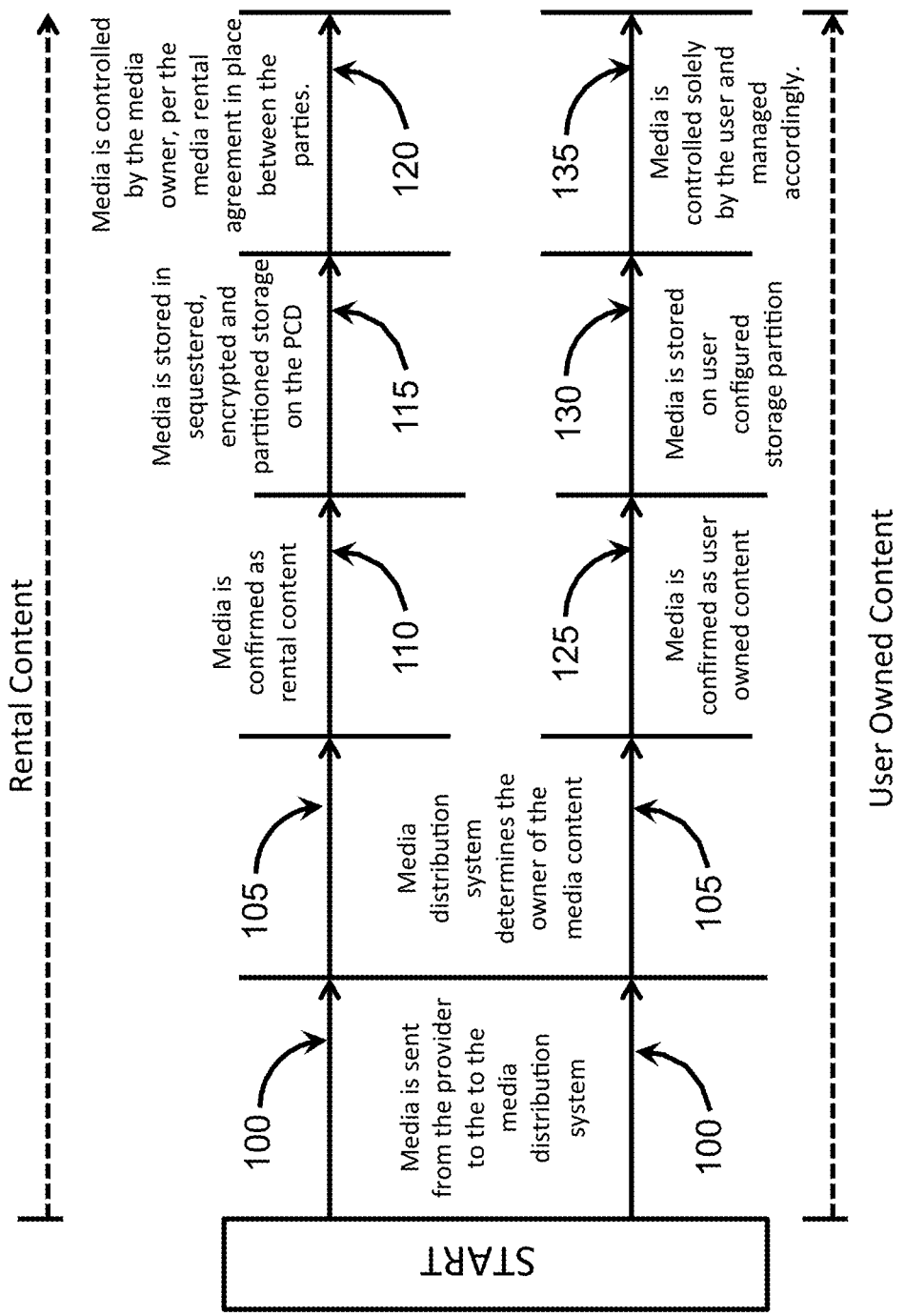
FIG. 1 is a flow diagram illustrating handling of media, including rights and ownership, via an exemplary media distribution system.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The media distribution system herein is generally configured to allow consumer access to digital media in a secure and/or controlled fashion via a local media access device. The media distribution system provides a digital media rental system, which allows a digital media provider to remotely connect to an end-user media access device to load the digital media content for a user. As used herein, media includes, but is not limited to, movies, music, videos, eBooks, digital news, concerts, sporting media, special event media, etc.

Media can be directly downloaded to the media access device at a predetermined time chosen by the user (subscription model). This allows users with lower bandwidth to take advantage of digital media services. Media can be chosen from an "app" that is loaded on any PC, laptop, portable smart device, tablet, smart phone, or other digital device that accesses the internet. The media distribution system may provide an application programming interface (API) to allow the user to access the content to be leased, rented, and/or purchased.

In addition, the media distribution system includes systems and methods for allowing media that is owned by the user of a media access device to be co-located (on the same device) as media that is owned by third parties. Security features of the media distribution system protect the interests of each party, prohibiting the other from accessing, copying, downloading, viewing, or otherwise connecting to the media without permissions being granted by the media's owner.

The digital media rental system allows a user to interact with one or more media providers to receive digital media (movies, music, eBooks, and other digital content). While other known devices provide a conduit to receive media in a similar fashion, the media access device herein differs significantly as will now be described.

In a typical movie or video rental scenario, a user will access a media provider from their internet ready TV or other portable internet device and browse the content offered by the provider. Once the content is chosen and purchased or rented, the content is made accessible for viewing and is streamed from the provider through the internet to the user's device. Streaming, commonly seen in the forms of audio and video streaming online (as used herein), refers to playing a media file without completely downloading the file first. The media may be buffered on a playback device while it is playing and downloading.

Once the media session is complete, the transaction ends. The media access device herein provides the capability of downloading multiple digital media files simultaneously, storing them for access at the user's convenience. In a similar manner to a movie rental model, the user can go to the online video store, choose multiple titles for viewing and have these titles delivered to the media access device. The rented or other purchased content is stored locally on the media access device for later use.

Traditionally leased or rented media is typically stored in cloud based or other online storage, but the media access device eliminates the need to store media remotely. A secondary function of the media access device is to allow temporary storage and management of media that is being leased or rented from a media provider (like Netflix™ or Blockbuster™). As will be described further below, the media access device provides separate and secure storage for rental media to ensure media security.

The media loaded to the media access device will typically be chosen from a media provider and be managed by a corresponding service agreement. A typical media provider service agreement allows users to pay a flat rate for a specific number of digital media rentals within a given period. As an example, we will assume 10 media rentals in a 30-day period. The user entering into the agreement will access the provider website and create a media list from which the provider will begin providing media directly to the user via the media access device as defined by this list. The user can manage their content list remotely from any of their internet ready devices. In this manner, media can be managed locally as well as remotely.

A key feature of the media access device lies in allowing the user to determine a time for the media to be delivered from the media provider to the media access device. This feature significantly improves user bandwidth optimization, and is particularly well suited for users with lower speed connections, which make streaming difficult, if not impossible. The user of the device can choose any time during the day or night for the delivery of the media to the device, allowing them to obtain it immediately or schedule the delivery of the media during non-peak usage hours, negating the need for higher bandwidth to enjoy the digital content.

Media rental or lease will now be described. It is noted that the user would create an account and/or login to a media provider website. Once at the media site, they create a list of media the user wishes to view for the given period (in this case, 30 days). Once the user has executed and completed the media agreements called for by the provider, they would choose a time of day in which the media would be delivered to their media access device.

At the predetermined time, the media provider would automatically access the media access device and begin downloading the media selections from the list created by the user. For this example, we will assume that the provider has agreed to allow the user to host or store three rental titles locally on their media access device at any given time.

The media would be loaded into the device in the sequestered and encrypted storage area of the media access device, limiting the user's options to those granted by the provider. These options would typically include, but are not limited to, play, rewind, pause, start, stop, fast forward, purchase, and delete. It is noted that the media access device may utilize various storage technologies now known or later developed, including magnetic, optical, or flash based storage.

The media would remain on the media access device for the time allotted, such as defined by the agreement entered into by the user and the media owner. Once the user has accessed and viewed the media, and indicated it should be deleted, it will be subsequently removed from the device, and be replaced by the next media selection from the user's list created and hosted on the provider site. The media access device will always host the minimum number of media titles (in this case three) giving the user a variety of choices, as opposed to the typical single movie streaming model. It will be understood that minimum numbers of media titles may be hosted on the media access device.

At any time within the media hosting arrangement, the user can choose to purchase a title from the media owner. Once the purchase has been completed, the media will be immediately removed from the sequestered storage portion of the device and relocated to a personal cloud portion of the device. This personal cloud portion is a media repository where the user keeps their personal digital content (i.e., the media the user owns), which may be managed through a media distribution system. Exemplary media distribution systems include StoAmigo™ (a cloud-based file management and storage system from Duvon Corporation), Dropbox™, Box™, SugarSync™, Google Drive™ and iCloud™

Though described herein with regard to movies or television shows, it is noted that the media access device may handle music, eBooks, and other digital media that can be rented or purchased from digital media providers in the same fashion.

Another advantage of the media distribution system is that it provides security for the rented or leased media. As described briefly above, in operation the security feature may store digital content delivered to the device from a provider in a sequestered storage area on a media access device that is controlled and managed (at least partially) by the provider. This allows the provider to execute permissions or conditions for use or access that may be associated with the media. In this manner, the provider has complete control and ownership of the media, even while the media is being hosted on the user's media access device.

The media will typically be encrypted to ensure that the user cannot accidentally or otherwise access the media without express permission. A media owner can therefore choose at any time to remotely delete and/or otherwise block usage of the media as well. This is because the permission setting on the media being shared is based on the recipient of the share, as opposed to the media itself. With this permission based sharing, media can be managed without the need for passwords and other antiquated protection methods. Permissions are always controlled by the owner of the media, and can be changed and/or revoked at any time. This gives the media owner ultimate control over their media. Media can be taken back at any time, regardless of the content of the share, the user the share is tied to, or the media being shared.

In addition to the encryption methodology for protection of the media, the media access device also incorporates a multiple-partition approach on its storage device designed to prevent access to the media that is owned, managed, and controlled by the media provider. Having rented media stored on a separate partition within the storage device of the media access device adds a second layer of security, ensuring the media remains the sole property of the media owner.

A typical scenario for media storage and access within the device will now be described with reference to the flow diagram of FIG. 1. At a step 100, rental media is sent from a media provider to the media access device. At a step 105, the media access device recognizes the content as leased or rented material, such as via an API, code identification, or other identification scheme provided by the media provider. If the media has been leased or rented, the identification process notifies the media access device that the material is not the property of the media access device's user at a step 110.

At a step 115, the media access device then routes the media to a secure partition or portion of the media access device's storage device for storage and access by the user. The media owner (in this case the media provider) maintains full rights of access, including removal and deletion of the media from the device and may control or change usage, access, or other rights/capabilities at a step 120. It is noted that while the media access device is storing the media for the user to access, it may also be encrypted to ensure that there is no way for the user to accidentally or otherwise gain access to the media without the express consent of the media owner.

As stated above, once the user is done with the media, it can either be purchased or removed from the media access device, thereby allowing the media provider to download another media selection from the user's list to the media access device, at the predetermined time defined by the user.

Referring to step 125, if the media is confirmed as user owned content, the media may be stored in a user partition on the media access device's storage device at a step 130. The user may then control or change usage, access, or other rights/capabilities to this user owned media at a step 135. It is understood that the storage can be (but is not limited to) a physical drive with dual (dedicated) partitions, one for the user and one for the provider, or completely separate physical drives.

Figure 2A:
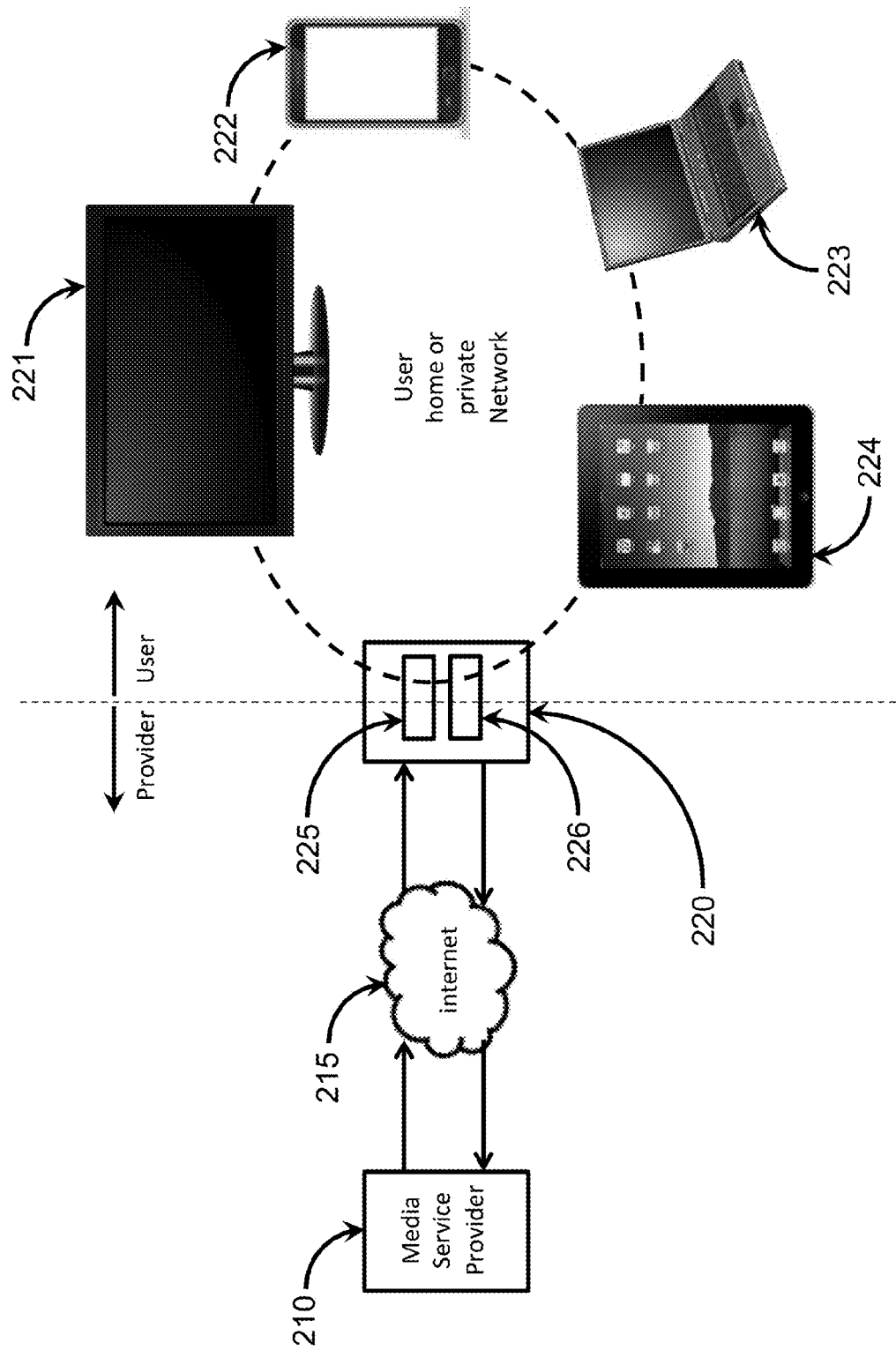
FIG. 2A is a block diagram illustrating an exemplary media distribution system and environment of use.

FIG. 2A is a block diagram illustrating an exemplary media distribution system 200. As can be seen, the media distribution system 200 may include one or more media access devices 220 connected to one or more media providers 210 via a network, such as the Internet 215. In one or more embodiments, the media access device 220 may be a network appliance or set top box type of device configured to operate as disclosed herein. Typically, the media access device 220 will include one or more wired or wireless communication devices to allow communication with a media provider 210 or other user devices (as will be described further below).

As can also be seen, the media access device 220 will typically be located at a user's premises, such as the user's home. The media provider 210, which may be a server or the like, may be remote from the media access device 220 and be in communication with the media access device 220 via the Internet 215 or other network.

The user may access (e.g., play) media hosted/stored on the media access device 220 from various client devices. As shown in FIG. 2A for example, the user may view or be presented media on the media access device 220 from a television 221, smartphone 222, laptop or other computer 223, or tablet 224. Typically, these devices will be on the same local network as the media access device 220. It is also noted that users incorporating devices like smartphone 222, laptop or other computers 223, and tablets 224 can access their media distribution system remotely (outside of their local area network (LAN) through a cloud service like StoAmigo. The user can access their cloud service from any available internet connection.

As described above, the user may host or store various media on the media access device 220. For security purposes, this media may be stored in various portions or partitions on a storage device of the media access device 220. As shown in FIG. 2A for example, a provider managed partition 225 and a user managed partition 226 are provided. The media provider 210 controls the provider managed partition 225 to retain control and ownership of its media even though the media access device is in the user's possession. Typically, rented or leased media will be stored in the provider managed partition 225, as described above. Similarly, the user controls the user managed partition 226, thereby allowing the user to control use or access of his or her media.

FIG. 2B is a detailed view of the media access device 220 in an exemplary environment of use. As can be seen, the user gains access to both the provider managed storage 225 and the user managed storage 226 from their local area wired 230 or wireless 231 local area network (LAN). As disclosed herein, the user can easily access and view the media hosted on either storage device within the media access device 220 from their TV 221, smartphone 222, laptop or desktop computer 223, and/or their tablet 224.

FIG. 2B also illustrates components of an exemplary media access device 220. As can be seen, the media access device 220 may comprise one or more processors communication devices, storage devices, and memory devices. One or more output devices, such as for outputting media to one or more client devices may optionally be provided. In general, an output device will directly provide an audio and/or video signal to a client device, such as a television 221, to present media thereon.

In general, a processor may be a microprocessor, controller, circuit or the like. In one or more embodiments, a process will be configured to control components of the media access device 220 to provide the functionality described herein. To illustrate, the instructions may be configured to segregate provider media and user media when stored and control access to the same as described herein. A processor may execute one or more instructions such as machine readable code to provide such functionality. It is contemplated that these instructions may be stored on a memory or storage device or may be hardwired into a processor. In some embodiments, the instructions may be stored on and retrieved from a non-transitory storage medium for execution by a processor.

A storage device may utilize various data storage technologies for reliably storing data thereon. For example, a storage device may be a magnetic hard drive, flash drive, or optical drive in one or more embodiments. Typically, the provider managed storage 225 and user managed storage 226 will be separate storage areas. It is contemplated that the provider managed storage 225 and user managed storage 226 may be separate storage areas or partitions on a single physical storage device or multiple storage devices.

Various communications devices may be provided as well. For instance, in the embodiment of FIG. 2B, the media access device 220 has a first communication device for communicating with a media provider 210 via a wide area network, namely the internet 215. The media access device 220 may also comprise one or more second communication devices for communicating via a local area network. In FIG. 2B for instance, the media access device 220 comprises a wireless LAN communication device as well as a wired LAN communication device. It is noted that one or the other or both may be provided in some embodiments.

In general, the second communications devices transmit media to one or more client devices on a local area network where the media may be presented/viewed by a user. To illustrate, it is contemplated that the local area network may be a local subnet at the user's location, such as the user's residence, office or the like. The first communication device may be used to receive media, such as rented or purchased media from a media provider 210, from a remote location via the internet 215 or other wide area network.

Figure 2C:
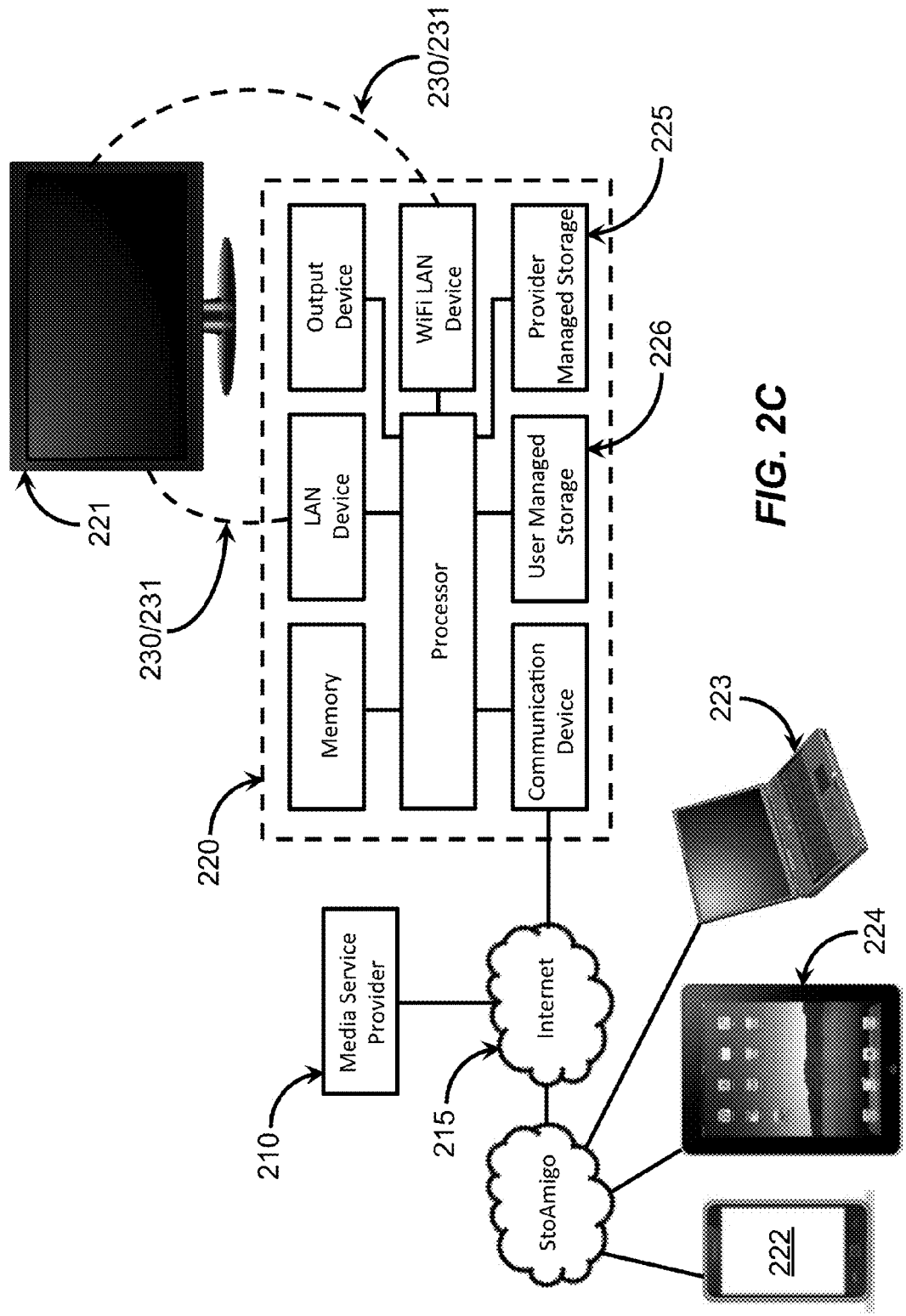
FIG. 2C is a block diagram illustrating an exemplary media distribution system and components thereof in an exemplary environment of use.

FIG. 2C illustrates how the user can access the provider managed content 225 as well as their own content 226 from any physical location that has an internet connection. The user can achieve this by first logging into their cloud storage provider (such as StoAmigo). The ownership of the media access device is then authenticated by the cloud storage system and remote access to the user device is granted. The user can now view, manage, and otherwise gain full access to the personal storage 226. The provider managed storage 225 will be governed by the terms of the user agreement in place between the media host and the user, but if the agreement allows remote access, the user will be able to view their rental content from anywhere they have internet access. This capability allows the user to freely view their media from home or on the road, providing ultimate accessibility to rented content.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A media access device comprising:
   one or more storage devices having at least one provider managed partition and at least one user managed partition;
   one or more communication devices that receive media; and
   one or more processors that determine if the media is provider media or if the media is user media based on ownership of the media;
   wherein the media is stored in the provider managed partition if the media is determined to be provider media, and the media is stored in the user managed partition if the media is determined to be user media;
   wherein the one or more processors move the provider media from the provider managed partition to the user managed partition when a user purchases the provider media.

2. The media access device of claim 1, wherein the one or more processors move the provider media from the provider managed partition to the user managed partition when ownership of the provider media changes.

3. The media access device of claim 1 further comprising one or more output terminals that output the user media or the provider media for presentation to a user.

4. The media access device of claim 1, wherein the one or more communication devices receive one or more instructions from a media provider defining use and access restrictions for the provider media.

5. The media access device of claim 1, wherein a media provider controls addition and removal of the provider media via the one or more communication devices.

6. The media access device of claim 5, wherein a user controls addition and removal of user media in the user managed partition.

7. A non-transitory storage medium storing instructions that, when executed, cause one or more processors to:
   receive media via one or more communication devices;
   determine if the media is provider media or if the media is user media based on ownership of the media;
   store the media in a provider managed partition of one or more storage devices if the media is determined to be provider media;
   store the media in a user managed partition of the one or more storage devices if the media is determined to be user media;
   transmit the provider media or the user media via one or more output terminals for presentation to a user; and
   move the provider media from the provider managed partition to the user managed partition when a user purchases the provider media.

8. The non-transitory storage medium of claim 7 further comprising instructions that cause the one or more processors to move the provider media from the provider managed partition to the user managed partition when ownership of the provider media changes.

9. The non-transitory storage medium of claim 7 further comprising instructions that cause the one or more processors to add or remove the provider media based on instructions received from a media provider.

10. The non-transitory storage medium of claim 9 further comprising instructions that cause the one or more processors to add or remove the user media based on instructions received from a user.

11. The non-transitory storage medium of claim 7 further comprising instructions that cause the one or more processors to change access and use restrictions for the provider media based on instructions received from a media provider.

12. The non-transitory storage medium of claim 7, wherein the provider media or the user media transmitted via the one or more output terminals is selected by a user.

13. A media access device implemented method for providing media
comprising:
receiving media via one or more communication devices of the media access device;
determining if the media is provider media or user media based on ownership of the media;
based on the determination, storing provider media in a provider media partition and storing user media in a user media partition;
presenting the provider media or the user media to a user via one or more output terminals of the media access device; and
moving the provider media to the user media partition when the provider media is purchased by a user;
wherein the provider media partition and the user media partition are partitions of one or more storage devices of the media access device.

14. The media access device implemented method of claim 13 further comprising moving the provider media to the user media partition when ownership of the provider media changes.

15. The media access device implemented method of claim 13 further comprising adding or removing the provider media based on one or more instructions from a media provider.

16. The media access device implemented method of claim 15 further comprising adding or removing the user media based on one or more instructions from a user.

17. The media access device implemented method of claim 13, wherein access to the provider media is provided based on use and access restrictions defined by a media provider.

* * * * *